United States Patent
Padwekar

(10) Patent No.: US 7,100,027 B1
(45) Date of Patent: Aug. 29, 2006

(54) SYSTEM AND METHOD FOR REPRODUCING SYSTEM EXECUTIONS USING A REPLAY HANDLER

(75) Inventor: Kiran A. Padwekar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/459,703

(22) Filed: Dec. 13, 1999

(51) Int. Cl.
*G06F 11/30* (2006.01)
*G06F 11/36* (2006.01)

(52) U.S. Cl. .................. 712/227; 712/228; 714/17; 714/25; 717/127

(58) Field of Classification Search ............ 712/227, 712/228; 714/17, 25, 30; 717/127–135
See application file for complete search history.

(56) References Cited

U.S. PATENT DOCUMENTS

| | | | | |
|---|---|---|---|---|
| 3,688,263 A | | 8/1972 | Balogh, Jr. et al. ...... 340/172.5 |
| 4,095,268 A | | 6/1978 | Kobayashi et al. ......... 364/200 |
| 5,301,198 A | * | 4/1994 | Kawasaki ................... 717/131 |
| 5,530,804 A | * | 6/1996 | Edgington et al. ............ 703/28 |
| 5,555,249 A | | 9/1996 | Hilley et al. ................ 371/21.1 |
| 5,678,003 A | | 10/1997 | Brooks ..................... 395/183.1 |
| 5,704,033 A | | 12/1997 | Park ....................... 395/183.06 |
| 5,724,505 A | * | 3/1998 | Argade et al. ................ 714/45 |
| 5,740,413 A | | 4/1998 | Alpert et al. ................ 395/568 |
| 5,758,059 A | | 5/1998 | Alexander ............. 395/183.06 |
| 5,951,696 A | | 9/1999 | Naaseh et al. ................ 714/34 |
| 5,963,737 A | * | 10/1999 | Mealey et al. .............. 710/260 |
| 6,065,106 A | * | 5/2000 | Deao et al. .................... 712/24 |
| 6,125,416 A | | 9/2000 | Warren ......................... 710/71 |
| 6,212,626 B1 | * | 4/2001 | Merchant et al. ........... 712/218 |
| 6,240,509 B1 | * | 5/2001 | Akkary ....................... 711/207 |
| 6,247,118 B1 | * | 6/2001 | Zumkehr et al. ........... 712/228 |
| 6,311,292 B1 | * | 10/2001 | Choquette et al. ............ 714/30 |
| 6,343,358 B1 | * | 1/2002 | Jaggar et al. ................ 712/227 |
| 6,349,397 B1 | | 2/2002 | Koga et al. ................. 714/727 |
| 6,356,960 B1 | | 3/2002 | Jones et al. .................... 710/5 |
| 6,598,112 B1 | | 7/2003 | Jordan et al. ............... 347/221 |
| 6,877,086 B1 | * | 4/2005 | Boggs et al. ............... 712/218 |
| 6,925,584 B1 | | 8/2005 | Padwekar et al. |

OTHER PUBLICATIONS

Hennessey, John L. et al., Computer Architecture A Quantative Approach, Second Edition, 1996, Morgan Kaufman Publishers, Inc., pp. 39-41.*
http://www.d.umn.edu/~jmackiew/comp3130_moreinfo_techdd.htm, publication date unknown.*
Borland C++ for Windows User's Guide, 1993, Borland International, Inc., version 4.0, pp. 103-122.*

* cited by examiner

*Primary Examiner*—Fritz Fleming
*Assistant Examiner*—Tonia L. Meonske
(74) *Attorney, Agent, or Firm*—Schwegman, Lundberg, Woessner & Kluth, P.A.

(57) ABSTRACT

Methods and systems for replaying arbitrary system executions are disclosed. A system includes a storage element, a memory hierarchy and a processor. The memory hierarchy is coupled to the storage element. The processor is coupled to the memory hierarchy. The processor executes instructions from the memory hierarchy. A replay handler is loaded into the memory hierarchy. The replay handler is executed for replaying at least one execution. In another embodiment, a method for replaying executions is disclosed. Normal execution of a processor is interrupted. A replay/restart kernel is loaded. At least one execution is replayed. Normal execution of the processor is resumed.

18 Claims, 4 Drawing Sheets

SYSTEM AND METHOD FOR REPRODUCING SYSTEM EXECUTIONS USING A REPLAY HANDLER

FIELD OF THE INVENTION

The present invention is related to processing systems, and more particularly to reproducing any arbitrary system execution on a processor.

BACKGROUND INFORMATION

Processing systems are continually designed with improved speed and capabilities compared to earlier designs. This results in complex processors with ever increasing instruction sets, registers, and caches. As the complexity of processors goes up, the amount of testing and debugging that is performed to maintain a reliable processing system increases. This testing and debugging is also performed to improve the speed and efficiency of code executed on the processing system.

A significant amount of debugging and performance enhancement is done before a processor can successfully be brought on the market. As the amount of debugging needed increases, the time before the finished product can be brought on the market increases. That precious time can be quite long with the current debugging methods.

The current debugging is tedious and time consuming. Testing hardware is usually required and is connected to the processor and puts the processor in a testing mode. Generally, a single instruction is executed and the results of that single execution are analyzed. The result of the execution is then compared to the expected results. For example, if the single instruction was to add "2+2" and put the result in a register and the instruction puts "6" in the register, an error has occurred. If the instruction puts "4" in the register, than an error has not occurred. Care is taken in selecting instructions to test the various aspects of the processor because only a limited number of instructions can feasibly be performed. Also, a user may be required to manually perform the testing and check for errors.

For relatively simple processors, only testing one instruction at a time may be sufficient for testing the processors. However, for more complex processors, only testing only one instruction at a time may not be sufficient to adequately test the processors. To execute more than one instruction or test instruction, each instruction must be loaded, executed and unloaded and then repeated for the next instruction. This "stepping through" can be time consuming for complicated tasks or large number of instructions. Further, additional tasks may need to be performed in between executing each instruction to analyze information and results of executing the instruction.

Furthermore, testing one instruction at a time does not allow for reproducing system level executions. A system level execution or system execution is any set of instructions executed on a processor. A system execution is some part or execution of a program or process on a processor. The system execution may be some part of an execution of a wordprocessor or an input output operation such as a file open command. Each system level execution can encompass a large number of instructions or code which prevents testing one instruction at a time from adequately testing them. It is important that programs execute properly in processing systems. Replaying system executions can allow hard to detect errors to be found in software and in processors or hardware. Additionally, replaying system executions can identify ways to design processing systems so that software can be executed faster.

The testing of system level executions may need to be repeated a significant number of times to adequately identify errors. Additionally, testing of system level executions may need to be restarted at different points in the code or certain parts of the code may need to tested.

Analyzing the information or results of an execution of an instruction can also be problematic with the current art of testing. The effect of one execution needs to be analyzed prior to executing another instruction. Furthermore, the current probe modes fail to provide access to many processing system components such as the system registers and memory. Thus, the results of executing a system execution may not be seen and errors in the processor may not be detected.

The present invention addresses these and other issues associated with replaying system executions.

SUMMARY OF THE INVENTION

One embodiment of the invention is a system. The system includes a storage element, a memory hierarchy and a processor. The memory hierarchy is coupled to the storage element. The processor is coupled to the memory hierarchy. The processor executes instructions from the memory hierarchy. A replay handler is loaded into the memory hierarchy. The replay handler is executed for replaying at least one execution.

One embodiment of the invention is a method for relaying executions. Normal execution of a processor is interrupted. A replay/restart kernel is loaded. At least one execution is replayed. Normal execution of the processor is resumed.

Other systems and methods are disclosed.

DETAILED DESCRIPTION

The following discussion sets forth numerous specific details to provide a thorough understanding of the invention. However, those of ordinary skill in the art, having benefit of this disclosure, will appreciate that the invention may be practiced without these specific details. In addition, various well known methods, procedures, components, and circuits have not been described in detail in order to focus attention on the features of the present invention.

Embodiments of the present invention permit replaying and reproducing any arbitrary system execution. Thus, processors of single or multi processor systems can be tested by replaying and reproducing system executions in a probe mode. As stated earlier, a system level execution or system execution is any set of instructions executed on a processor. A system execution is some part or execution of a program or process on a processor. The system execution may be some part of an execution of a wordprocessor or an input output operation such as a file open command.

Figure 1:
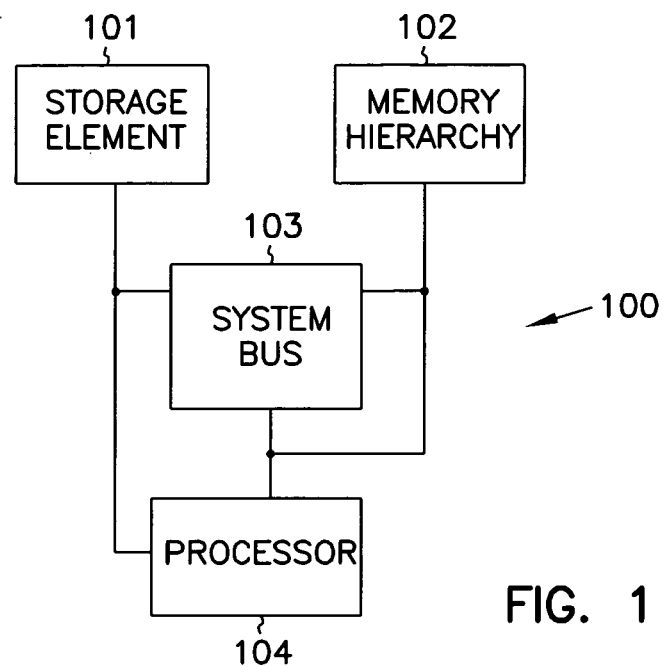
FIG. 1 is a block diagram of a system according to an embodiment of the invention.

Referring to FIG. 1, a system 100 for reproducing executions according to one embodiment of the invention is disclosed. The system 100 includes a storage element 101, a memory hierarchy 102, a system bus 103, and a processor 104. The storage element 101 can be any device capable of storing data. For example, the storage element can be dynamic memory or a hard drive. The storage element 101 can be physically located away from the other elements of the system.

The memory hierarchy 102 can be an amount of dynamic ram, cache memory, a linear array, or virtual memory. For example, the memory hierarchy can be an instruction cache on the processor chip.

The system bus 103 can be a single bus or a combination of multiple buses. System bus 103 provides communication links between components. The system bus is coupled to the storage element 101, the memory hierarchy 102 and the processor 104. The system bus 103 may be coupled to other system components such as other memory hierarchies, peripheral devices and other processors in the computer system.

The processor 104 can be any type of processor. The processor 104 may be compatible with, but is not limited to, processors such as an Intel® architecture processor, manufactured by Intel Corporation of Santa Clara, Calif., the assignee of the present invention. The processor 104 can use 32 bit instructions or 64 bit instructions. The processor 104 may be pipelined. The processor 104 executes code from the memory hierarchy 102. The processor 104 may be one of a number of processors in a computer system.

To reproduce system executions on the processor 104, the processor 104 is brought into a replay state from a normal state. The normal state is simply the state the processor is in when it is operating and processing normally. The replay state is a state where test instructions or code of executions can be executed and monitored. To cause the processor 104 to enter the replay state, a replay break or signal is generated. The break or signal can be generated a number of ways and may be generated similar to other interrupts or breaks in a computer system. The break may be generated by the processor 104 encountering a break instruction or by a hardware event such as connecting to or asserting a pin of the processor.

On receiving the replay break, the current processes executing on the processor 104 are stopped or halted. If the processor 104 is pipelined, the pipeline of the processor is stalled or flushed as needed and the contents and status of the stages may be saved to the storage element. The contents of the memory hierarchy 102, also known as the original code, are saved to the storage element. Further, minimal state information may be saved to or stored on the storage element. The minimal state information is the information necessary to resume execution of the processes that were interrupted. For example, the minimal state information can include an instruction pointer so that when the normal state is resumed, processes can be restarted at the appropriate instruction. Additionally, timers and counters are disabled. After the current information, which includes the contents and status of the flushed stages, the original code and the minimal state information, is saved, a replay handler is loaded into the memory hierarchy. The replay handler can be loaded from another device such as system memory, a separate computer system or other peripheral device.

The replay break operates similar to other interrupts or breaks that occur in typical computer systems. However, the replay break causes the processor to 104 to execute the replay handler that has been loaded into the memory hierarchy 102. After the replay handler has been loaded into the instruction cache, the processor is in the replay state and the replay handler is executed.

The replay handler may be generated by a user or according to user specifications and contains code that, when executed, allows executions to be reproduced and replayed. The replay handler may also be called a replay/restart kernel (RRK). The replay handler also monitors the architectual state and can access the content and status of registers, memories, and other components. The initial architectural state is also known as a replay state. The replay state or architectual state may include a functional state and a performance state. The functional state information such as architectural registers and model specific registers. This functional state may include hidden state information necessary for functionality. The performance state or steady state includes all the state information that remains after draining all the pipelines that is significant for performance and includes information on caches and structures such as an instruction cache or data cache, translation look aside buffer (TLB) hierarchy, and branch prediction structures. The replay handler may also store the architectual state to a storage device or some other device so that the architectual state may be reviewed or analyzed at a later time. The replay handler may contain the code of the execution(s) to be replayed or the replay handler may dynamically load executions from into the memory hierarchy and cause those executions to be executed. The dynamically loaded executions may have been stored at a location or they may be dynamically generated by a user. Additionally, the dynamically loaded executions may be generated by another processor or computer system. Other similar embodiments may use other methods of loading and determining executions to be executed.

The replay handler may keep track of the processor clock cycles and system bus cycles that pass after the break to allow normal execution to be resumed synchronously. For example, there may be 4 clock cycles for each bus cycle or a bus cycle every 4 clock cycles. Generally, a system bus operates at a lower frequency clock than a processor. The replay handler may delay exiting the replay state a determined number of cycles so that execution is resumed at the appropriate time. For example, normal execution may have been interrupted 1 clock cycle before a bus cycle and may be resumed 1 clock cycle before a bus cycle so that interrupted processes are resumed without knowledge of their being interrupted. Synchronous execution is when the clock cycle and bus cycle are related such that at regular intervals they occur simultaneously. Alternately, the replay state is exited when the system bus clock coincides with the processor clock.

A way to access the state information is by utilizing a control register access bus (CRAB). The CRAB permits access to most or all registers in the processor and to other components of the system. The CRAB is separate from other system busses and may access contents and status of registers and other components of the computer system without interrupting processing.

The executions to be reproduced or replayed may be generated or determined a number of ways. Trace hardware or software may be used to generate an execution to be replayed by tracing or recording a program execution. Tagging may also be used. Programs or applications may be executed and analyzed for highly repeated executions. Thus, the highly repeated executions may be analyzed to increase performance of the processor 104.

Figure 5:
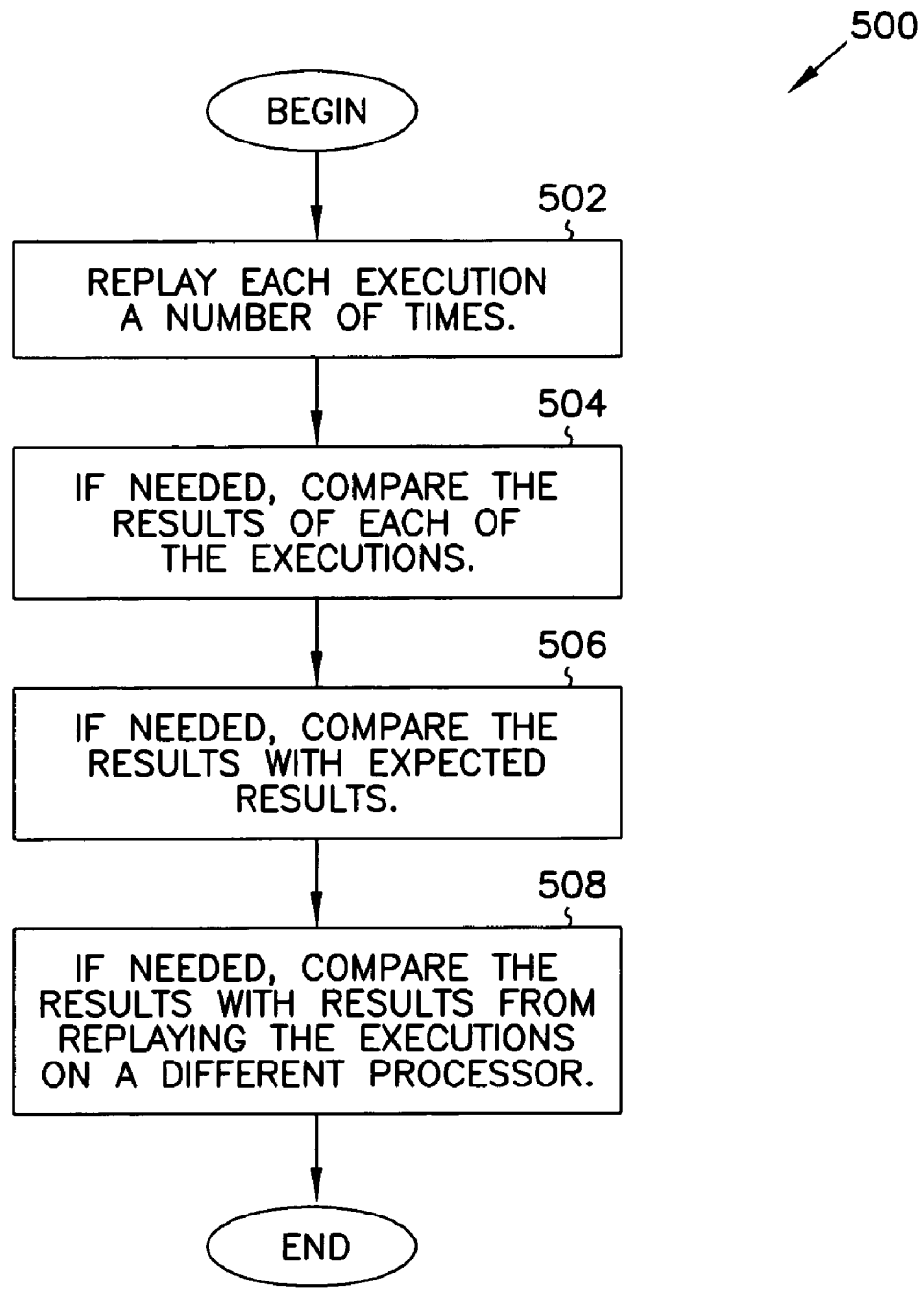
FIG. 5 is a flow chart of a method according to an embodiment of the invention.

There can be one or more executions to be reproduced or replayed by the replay handler. As disclosed in FIG. 5, the replay handler may replay each execution a number of times (502) and compare the results of each executions (504). Furthermore, the results may be compared with expected results (506) or the results may be compared with results from replaying the execution on a different processor (508). It may be desirable when replaying executions to have system calls return the same result in each replay of the execution so the execution behavior can be analyzed easier. For example, a system call that requests the time of day may get the same response for the time of day for a hundred replays including that system call so that each execution may be compared easier.

The replay handler may have a predetermined number of replays for each execution. Alternately, the replay handler may dynamically determine the number of replays for each execution. Or, the replay handler may communicate with a user or separate computer system to determine the number of replays. Additionally, the replay handler may modify the starting and stopping points of replays. For example, the replay handler may modify the starting point to be the 58th instruction of the system execution instead of the first instruction of the system execution.

After the executions have completed being replayed and reproduced, the processor 104 exits replay mode and returns to normal mode. The pipeline of the processor 104 may then be stalled. Replay mode is exited by reloading the memory hierarchy with the original code, reinserting contents of previously flushed stages with their original information, and resuming execution of processes that were stopped or halted. In one embodiment, a stalled pipeline is not released until the system bus clock coincides with the processor clock. The minimal state information may be utilized to resume execution. Disabled timers and counters may be enabled.

Figure 2:
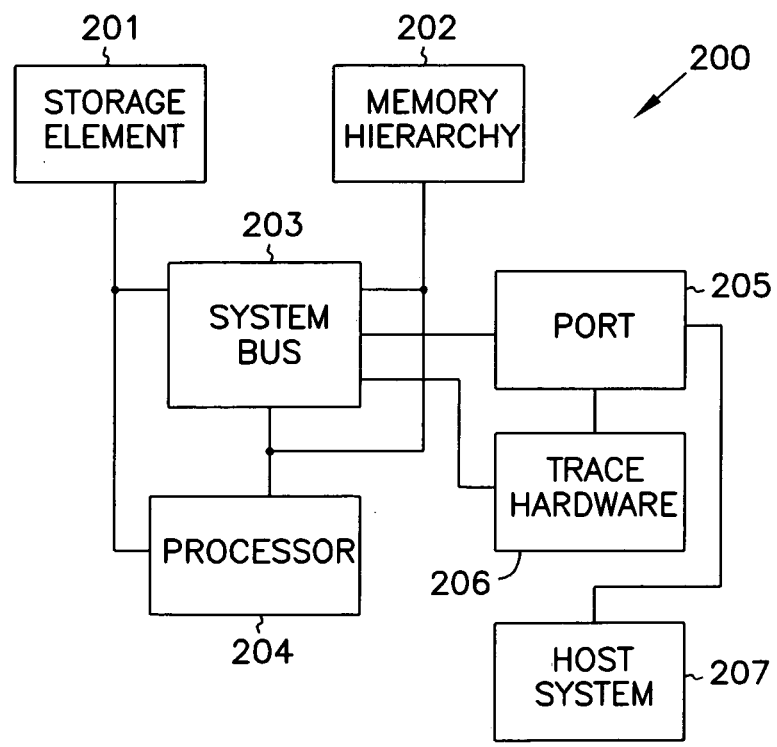
FIG. 2 is a block diagram of a system according to an embodiment of the invention.

FIG. 2 discloses a system 200 for reproducing executions according to one embodiment of the invention. The system includes a storage element 201, a memory hierarchy 202, a system bus 203, a processor 204, a port 205, trace hardware 206 and a host system 207. The storage element 201 can be any device capable of storing data. For example, the storage element can be dynamic memory or a hard drive. The storage element 201 can be physically located away from the other elements of the system.

The memory hierarchy 202 can be an amount of dynamic ram, cache memory, a linear array, or virtual memory. For example, the memory hierarchy can be an instruction cache on the processor chip.

The system bus 203 can be a single bus or a combination of multiple buses. System bus 203 provides communication links between components. The system bus is coupled to the storage element 201, the memory hierarchy 202 and the processor 204. The system bus 203 may be coupled to other system components such as other memory hierarchies, peripheral devices and other processors in the computer system.

The processor 204 can be any type of processor. The processor 404 may be compatible with, but is not limited to, processors such as an Intel® architecture processor, manufactured by Intel Corporation of Santa Clara, Calif., the assignee of the present invention. The processor 204 can use 32 bit instructions or 64 bit instructions. The processor 204 may be pipelined. The processor 204 executes code from the memory hierarchy 202. The processor 204 may be one of a number of processors in a computer system.

The port 205 is coupled to the system bus 203 and the host system 207. The port 205 may also be coupled to the storage element 201, the memory hierarchy 202, the processor 204 and trace hardware 206. The port 205 may also be known as a terminal access port. Generally, the port 205 provides an interface between the host system 207 and the system bus 203. The port 205 can be any type of interface such as but not limited to a serial interface and a universal serial bus (USB) interface. Additionally, the port 205 may be a network interface and allow connection to a host system 207 located across a network such as the Internet.

The trace hardware 206 is coupled to the system bus 203. The trace hardware can monitor most or all pins of the processor 204. The trace hardware may send this information to the host system 207. The trace hardware 206 may also be coupled to the host system 207. Additionally, the trace hardware 206 may gather state information including but not limited to contents and status of registers, system memory and other components. The trace hardware may send this state information to the host system 207.

The host system 207 may be a computer system or other electronic device. The host system controls the replaying of executions. The host system may initiate or end testing or replaying of executions. Software may be running on the host system 207 and the software may be controlling testing. Additionally, a user may use the host system to modify testing and replaying of code. The host system generates the replay handler in this embodiment and stores it on the host system. The host system 207 may be able to analyze and compare information obtained by replaying the various executions. The host system may be coupled to other processor based systems to replay executions on the other processor based systems.

To reproduce system executions on the processor 204, the processor 204 is brought into a replay state from a normal state. The normal state is simply the state the processor is in when it is operating and processing normally. The replay state is a state where test instructions or code of executions can be executed and monitored. To cause the processor 204 to enter the replay state, a replay break or signal is generated. The break or signal can be generated by the host system 207.

On receiving the replay break, the current processes executing on the processor 204 are stopped or halted. If the processor 204 is pipelined, the pipeline of the processor is stalled or flushed as needed and the contents and status of the stages may be saved to the storage element. The contents of the memory hierarchy 202, also known as the original code, are saved to the storage element. Alternately, the original code may be saved or stored to the host system 207. Other buffers in the system may be drained or emptied. Further, minimal state information may be saved to or stored to the host system 207. The minimal state informaion is the information necessary to resume execution of the processes that were interrupted. For example, the minimal state information can include an instruction pointer so that when the normal state is resumed, processes can be restarted at the appropriate instruction. Additionally, timers and counters are disabled. After the current information, which includes the contents and status of the flushed stages, the original code and the minimal state information, is saved, a replay handler is loaded into the memory hierarchy. The replay handler is loaded from the host system 207.

The replay break operates similar to other interrupts or breaks that occur in typical computer systems. However, the replay break causes the processor to 204 to execute the replay handler that has been loaded into the memory hierarchy 202. After the replay handler has been loaded into the instruction cache, the processor is in the replay state and the replay handler is executed.

The replay handler may be generated by the host system 207 and contains code that, when executed, allows executions to be reproduced and replayed. The replay handler may also be called a replay/restart kernel (RRK). The replay handler also monitors the architectual state and can access the content and status of registers, memories, and other components. The initial architectual state is also known as a replay state. The replay state or architectual state may include a functional state and a performance state. The functional state information such as architectural registers and model specific registers. This functional state may include hidden state information necessary for functionality. The performance state or steady state includes all the state information that remains after draining all the pipelines that is significant for performance and includes information on caches and structures such as an instruction cache or data cache, translation look aside buffer (TLB) hierarchy, and branch prediction structures. The replay handler may also store the architectual state to a storage device or some other device so that the architectual state may be reviewed or analyzed at a later time. The replay handler may contain the code of the execution(s) to be replayed or the replay handler may dynamically load executions from into the memory hierarchy and cause those executions to be executed. The dynamically loaded executions may have been stored at a location or they may be dynamically generated by a user. Additionally, the dynamically loaded executions may be generated by another processor or computer system. Other similar embodiments may use other methods of loading and determining executions to be executed.

A way to access the state information is by utilizing a control register access bus (CRAB). The CRAB permits access to most or all registers in the processor and to other components of the system. The CRAB is separate from other system busses and may access contents and status of registers and other components of the computer system without interrupting processing.

The executions to be reproduced or replayed may be generated or determined a number of ways. Trace hardware or software may be used to generate an execution to be replayed by tracing or recording a program execution. Tagging may also be used. Programs or applications may be executed and analyzed for highly repeated executions. Thus, the highly repeated executions may be analyzed to increase performance of the processor 204.

There can be one or more executions to be reproduced or replayed by the replay handler. The replay handler may replay each execution a number of times and compare the results of each executions. Furthermore, the results may be compared with expected results or the results may be compared with results from replaying the execution on a different processor. It may be desirable when replaying executions to have system calls return the same result in each replay of the execution so the execution behavior can be analyzed easier. For example, a system call that requests the time of day may get the same response for the time of day for a hundred replays including that system call so that executions may be compared to each other more easily.

The replay handler may have a predetermined number of replays for each execution. Alternately, the replay handler may dynamically determine the number of replays for each execution. The host system 207 is able to communicate with the replay handler and may command the replay handler to replay executions that the host system 207 designates. Additionally, the replay handler may modify the starting and stopping points of replays.

After the executions have completed being replayed and reproduced, the processor 204 exits replay mode and returns to normal mode. Replay mode is exited by reloading the memory hierarchy with the original code, reinserting contents of previously flushed stages with their original information, and resuming execution of processes that were stopped or halted. The minimal state information may be utilized to resume execution. Disabled timers and counters may be enabled.

Figure 3:
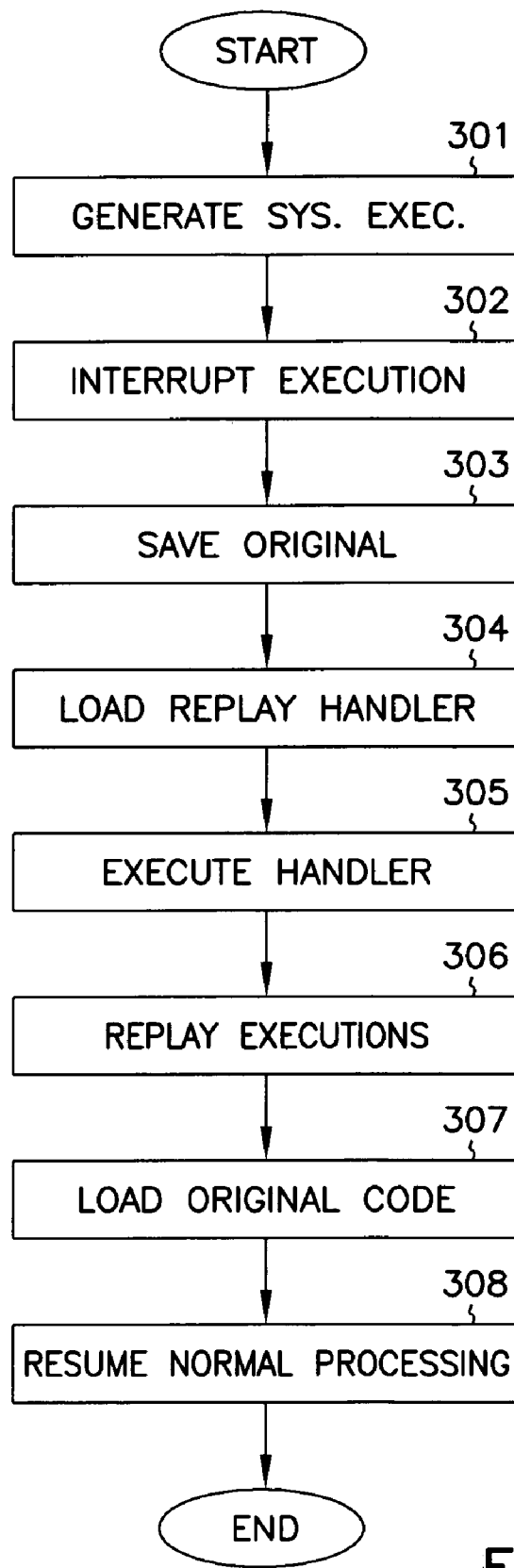
FIG. 3 is a flow chart of a method according to an embodiment of the invention.

Referring to FIG. 3, a method for replaying executions on a processor according to one embodiment of the invention is disclosed. The processor may be compatible with, but is not limited to, processors such as an Intel® architecture processor, manufactured by Intel Corporation of Santa Clara, Calif., the assignee of the present invention. For this embodiment, the processor may use a 32 bit instruction set or a 64 bit instruction set. The processor may be pipelined. The processor is part of a computer system that may contain other processors. The processor executes instructions located in an instruction cache.

One or more system executions are generated 301. The system executions may be generated by utilizing tracing hardware or software to trace an execution of a program or application. A system execution or execution is one execution of a program. The execution may only be a part of the total execution of that program. Alternately, a user may generate a series of instructions to simulate an execution.

The execution of the processor is stopped in response to a replay break 302. The processor is not required to be in any special mode to receive the replay break. The replay break can be a break, signal or interrupt. The replay break acts similar to a normal interrupt or exception. When normal interrupts occur, execution breaks or transfers to a interrupt handler which is usually located in system memory. However, the replay break causes the processor to enter replay and causes original code in an instruction cache to be saved 303, a replay handler to be loaded into the instruction cache 304 and the replay handler is executed. The replay break signal can be generated any number of ways such as by asserting a pin on the processor or by setting a breakpoint in an instruction. The original code from the instruction cache can be saved to a storage unit. In another embodiment, a memory hierarchy can be used in place of the instruction cache. The memory hierarchy is any device capable of storing code such as cache, dynamic memory, or virtual memory. The original code is code that was in the instruction cache or memory hierarchy at the time the replay break occurred. Additionally, some state information including but not limited to information such as an instruction pointer and register contents is saved. The state information allows resuming normal execution after testing is complete. The storage unit can be any device capable of storing code. For example, the storage unit could be a hard drive or dynamic memory.

The computer system the processor is in is permitted to reach a steady state. This may include allowing a pipeline to drain, allowing buffers to drain, or stalling a pipeline.

The processor runs or executes the replay handler 305. The replay handler includes code that can be executed to allow access to architectural state information of the processor known as a replay state. The architectural state information generally includes the contents and status of all registers, memories, caches, and busses in the computer system. The replay handler may also be called a replay/restart kernel (RRK).

One way that the replay handler may access the state information is by utilizing a control register access bus (CRAB). The CRAB is a special bus that connects to most or all registers and memory and permits access to those components and is separate from other system buses. Thus, the replay handler may access most or all state information.

The replay handler may include the code for the executions or the replay handler may load the code for the executions from another device. The replay handler causes replays of executions 306 to be performed on the processor. The replay state may be monitored and stored as replay state information while the executions are executed. The replay state information can be used to determine if the processor has committed an error or can be used to measure performance. The replay information can be compared to expected values to see if an error has occurred. The replay information may be saved to another device or location so that it may be analyzed and processed further at a later timer. Further, the replay information may be compared to results of other executions of to compare the results.

After the test code has been executed, the replay handler loads the original code into the instruction cache 307. The replay handler may also update registers with the state information required for resuming normal processing. The processor exits replay and resumes normal processing 308. Processes that were running or executing on the processor prior to entering replay may not even be aware that their execution was interrupted.

In another embodiment, the method further includes loading a system execution loader into the instruction cache. The system execution loader can be executed during replay to executions to be loaded to the instruction cache and unloaded from the instruction cache. The loader permits replaying executions which would not fit into the instruction cache.

The loader can load instructions not yet executed by swapping executed instructions or code with unexecuted instructions or code stored at another location.

In another embodiment where the processor is a pipelined processor, the method includes saving instructions or code located in the pipeline and flushing or stalling the pipeline prior to entering replay. Generally, a pipeline has a number of stages and each stage can contain an instruction or other information. A flush causes a number of stages of the pipeline to be flushed. The range of stages to be flushed are designated in a flush signal and only those stages are flushed or emptied. For example a flush signal to flush stages 1–3 of a 5 stage pipeline would flush stages or latches 1–3 and leave the 4–5 stages as they were. A stall is similar to a flush and causes a number of stages of a pipeline to be stalled. A stall signal specifies a range of stages to be stalled and only those stages are stalled. The contents of the stalled stages remain the same until the stall signal is ended or another signal signals that the stall is over. While in replay, the instructions of the executions can be inserted into the pipeline at an appropriate stage and executed. The pipeline may be flushed and stalled as necessary on or prior to exiting the replay stage. On exiting replay, flushed stages can have their original code or information inserted and stalled stages can be released to allow normal execution to resume.

Figure 4:
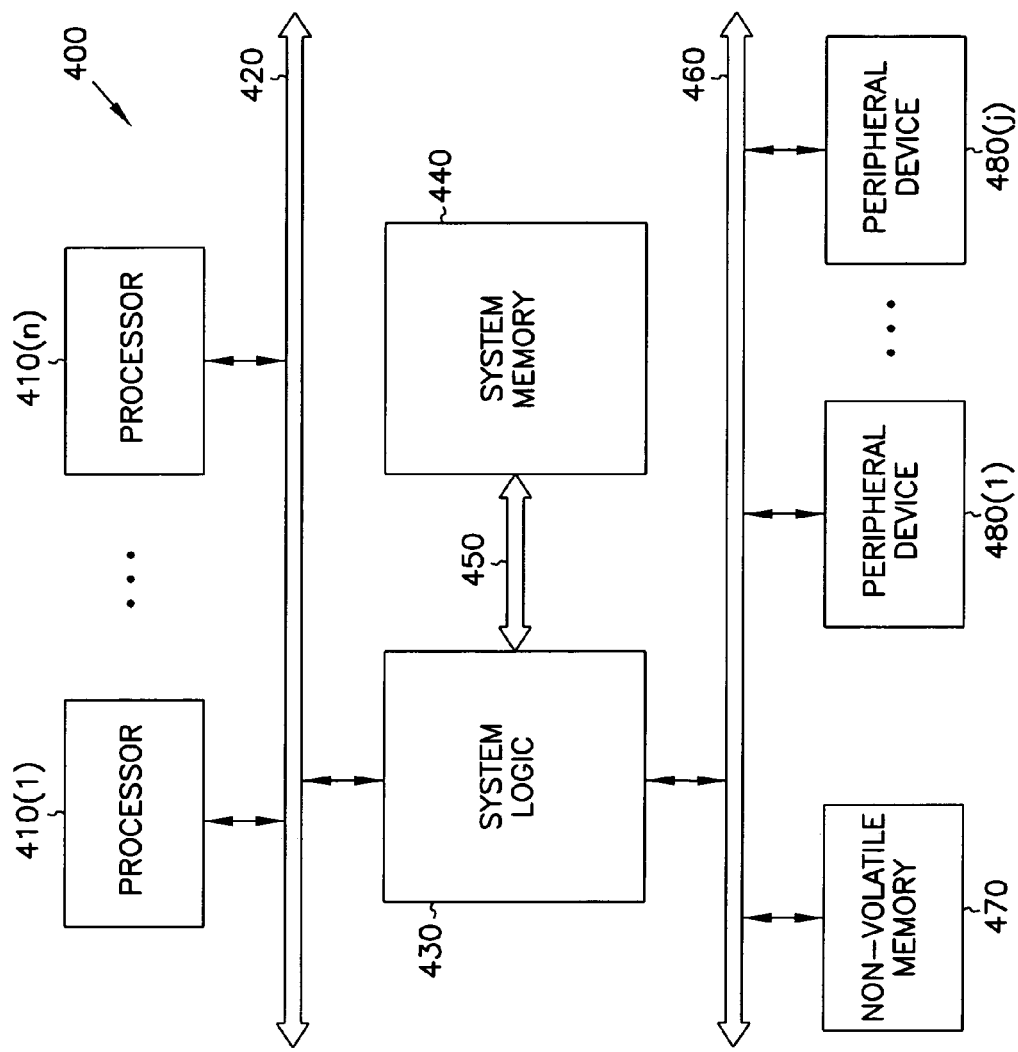
FIG. 4 is a block diagram of a computer system with which embodiments of the invention may be used.

FIG. 4 is a block diagram of one embodiment of a computer system 400 that is suitable for implementing the present invention. The disclosed embodiment of computer system 400 includes a plurality of processors 410(1)–410(n) that are coupled to system logic 430 through a processor bus 420. A system memory 440 is coupled to system logic 430 through bus 450. A non-volatile memory 470 and one or more peripheral devices 480(1)–480(j) (collectively, devices 480) are coupled to system logic 430 through peripheral bus 460. Peripheral bus 460 represents, for example, one or more peripheral component interconnect (PCI) buses, industry standard architecture (ISA) buses, extended ISA (EISA) buses, and comparable peripheral buses. Non-volatile memory 470 may be a static memory device such as a read only memory (ROM) or flash memory. Peripheral devices 480 include, for example, a keyboard, mouse or other pointing devices, mass storage devices such as hard drives and digital video discs (DVD), a display, and the like. These devices, together with system logic 430 define the computing platform for system 400.

For the disclosed embodiment of system 400, processors 410(1)–410(n) may execute code or routines stored in system memory 440. The processor also executes code from the non-volatile memory 470. Additionally, the processor may execute code from an instruction cache.

The various embodiments provide a number of advantages over the prior art. By allowing executions to be replayed and reproduced while monitoring them, processors can be redesigned and enhanced. Further, processors can be made more reliable. Additionally, allowing access to and storing state information permits valuable analyzing of state information. By utilizing ports to transfer state information, state information may be transferred quickly and easily to other devices.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A system comprising:
   a storage element;
   a memory hierarchy coupled to the storage element; and
   a processor coupled to the memory hierarchy, wherein in response to receiving a single replay indicator, the processor is to repeatedly execute a plurality of instructions a plurality of times using a replay handler loaded into the memory hierarchy, wherein the processor does not require receipt of another replay indicator to repeatedly execute the plurality of instructions, and wherein the processor is to compare results from one of the executions of the plurality of instructions to results from another of the executions of the plurality of instructions.

2. The system of claim 1 wherein the memory hierarchy is an instruction cache.

3. The system of claim 1 wherein the replay handler includes the plurality of instructions.

4. The system of claim 1 wherein the replay handler loads the plurality of instructions into the memory hierarchy from an external device.

5. A system comprising:
   a memory hierarchy;
   a processor coupled to the memory hierarchy wherein the processor is to execute instructions from the memory hierarchy;
   a port coupled to the processor and memory hierarchy; and a host system coupled to the port, the host system to generate a replay handler, to generate at least one execution to be repeatedly replayed by the processor when executing the replay handler, and to generate a signal to the processor to cause the processor to load the replay handler into the memory hierarchy and to cause the processor to repeatedly replay the at least one execution, wherein the processor is capable of repeatedly replaying the at least one execution without generation of another signal to cause the processor to load the replay handler into the memory hierarchy, and wherein the host system is to compare a first result of replaying the at least one execution to a second result of replaying the at least one execution.

6. The system of claim 5, wherein after the signal is generated, the processor to save original code of the memory hierarchy, the processor to load the replay handler into the memory hierarchy from the host system through the port, and the processor to execute the replay handler.

7. The system of claim 6, wherein after the replay handler is executed, the host system to modify the replay handler.

8. The system of claim 7 wherein the replay handler is modified to alter starting and stopping points of one of the at least one executions.

9. The system of claim 5 wherein a replay state is sent to the host system through the port.

10. The system of claim 5, wherein the port is a network interface.

11. The system of claim 5, wherein the port is a serial interface.

12. A method comprising:
testing a processor in response to a replay break including,
interrupting processes executing on the processor;
storing minimal state information sufficient to later resume the interrupted processes;
storing original code of an instruction cache;
loading a replay handler into the instruction cache;
branching execution of the processor to the replay handler;
replaying a system execution a number of times from a starting point to a stopping point while monitoring state information to test for proper operation of the processor, wherein the replaying the system execution a number of times does not require responding to another replay break;
comparing results of replaying the execution one time to results of replaying the execution other times,
loading the original code into the instruction cache; and
resuming interrupted processes utilizing the minimal state information.

13. The method of claim 12, wherein the number of times, the starting point, and the stopping point were modified by a user.

14. The method of claim 12 further comprising:
generating the system execution by tracing an execution of a program.

15. A computer readable medium containing computer instructions for instructing a processor to perform a method of:
generating at least one execution that includes a plurality of processor instructions; and
testing the processor in response to the processor receiving a single replay break, wherein the testing includes,
interrupting normal processing;
loading a replay handler into a memory hierarchy;
repeatedly replaying the at least one execution to test for proper operation of the processor, wherein the repeatedly replaying the at least one execution does not require the receipt of another replay break;
comparing results of replaying the execution one time to results of replaying the execution multiple times;
accessing state information;
storing state information; and
resuming normal processing.

16. The computer readable medium of claim 15, wherein the replay handler includes computer instructions which, when executed, cause the repeatedly replaying the at least one execution to occur.

17. The computer readable medium of claim 15, wherein the replay handler has a predetermined number of replays for the at least one execution.

18. The computer readable medium of claim 15, wherein the replay handler dynamically determines the number of replays for the at least one execution.

* * * * *

UNITED STATES PATENT AND TRADEMARK OFFICE
CERTIFICATE OF CORRECTION

PATENT NO. : 7,100,027 B1 Page 1 of 1
APPLICATION NO. : 09/459703
DATED : August 29, 2006
INVENTOR(S) : Padwekar It is certified that error appears in the above-identified patent and that said Letters Patent is hereby corrected as shown below:

Title Page, Item (75), in "Inventor", in column 1, line 1, delete "Santa Clara" and insert -- San Jose --, therefor.

Title Page, Item (56), under "Other Publications", in column 2, line 1, after "L." insert -- , --.

Title Page, Item (56), under "Other Publications", in column 2, lines 4-5, delete "techdd. htm" and insert -- techdd.htm --, therefor.

Signed and Sealed this

Fifth Day of August, 2008

JON W. DUDAS
*Director of the United States Patent and Trademark Office*